July 7, 1931.   G. FLEISCHEL   1,813,731
AUTOMATIC GEAR SHIFT
Filed March 4, 1931   2 Sheets-Sheet 1
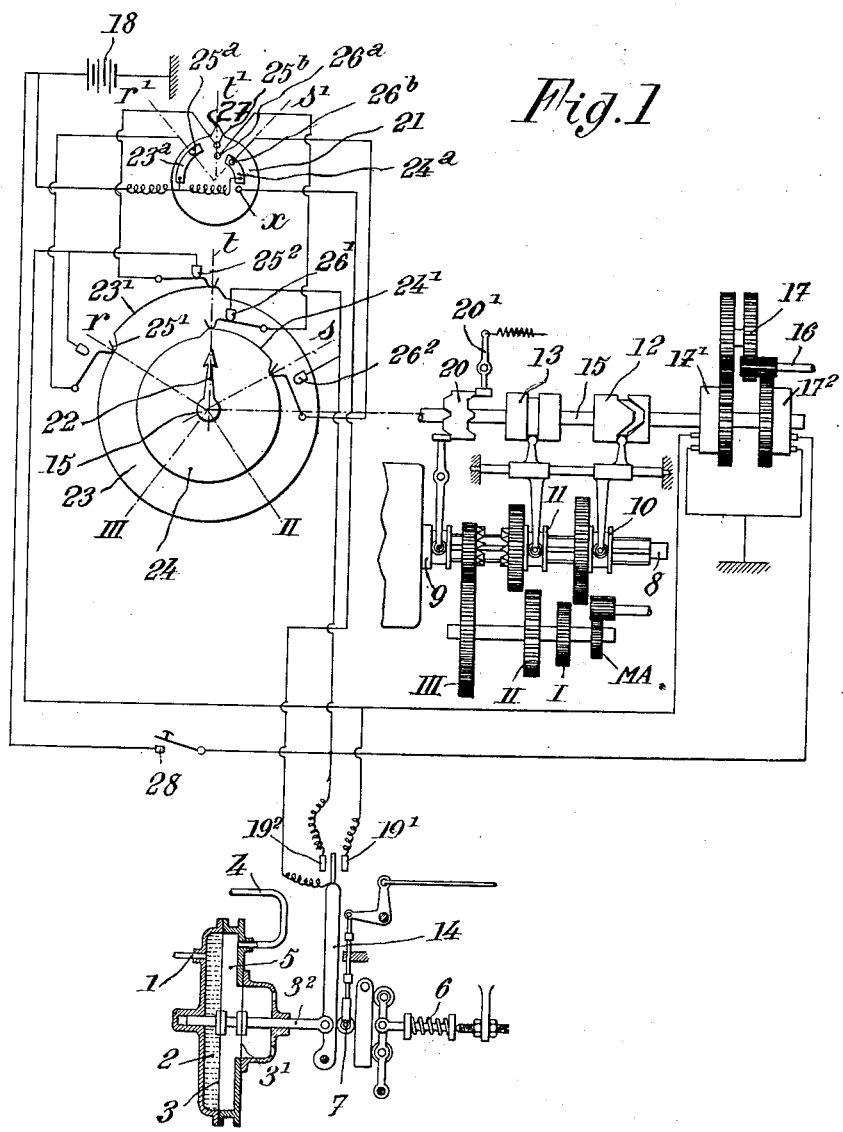
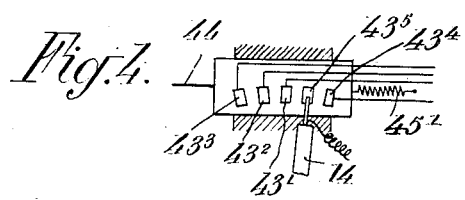
Gaston Fleischel
Inventor
by Louis Barnett
Attorney

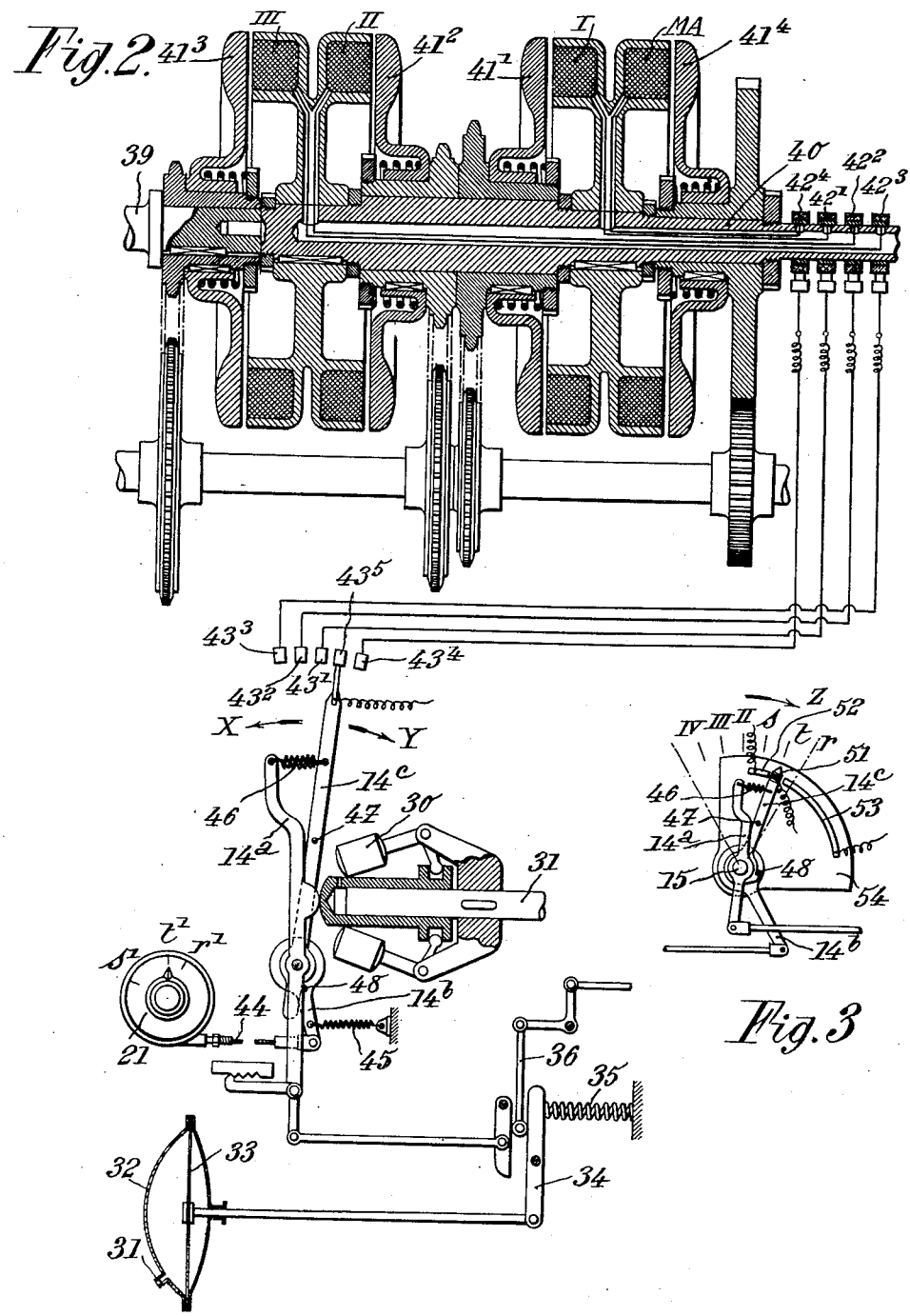

Patented July 7, 1931

1,813,731

UNITED STATES PATENT OFFICE

GASTON FLEISCHEL, OF BLENEAU, FRANCE

AUTOMATIC GEAR SHIFT

Application filed March 4, 1931, Serial No. 520,089, and in Italy March 28, 1930.

The present invention relates to automatic gear shifts and, more particularly, to those of the type designed to be used on automobiles or the like.

Up to the present time, it has been the custom to employ gear shifting levers and clutches in automatic gear shifting systems.

One of the objects of the present invention is to do away with gear shifting levers and clutches entirely, and to substitute therefore a dial type of control capable of being set for (1) reverse (2) advance (3) or neutral said control effecting all the operations normally carried out with an automobile.

Another object is to provide a dial control type of electro-magnetic speed changing assembly.

A further object is to provide an assembly of contacts capable of being moved relatively to a speed control lever and operating to automatically shift a plurality of gears or speed control mechanisms.

Still further objects will appear in the course of the detailed description now to be given with reference to the accompanying drawings, in which:

Fig. 1 represents, diagrammatically, one constructive embodiment of the invention;

Fig. 2 is a similar diagram, partially in section of a second form of the invention applied to an electro-magnetic form of speed changing system;

Fig. 3 represents a variant of part of the assembly illustrated in Fig. 2;

Fig. 4 is a second variant of the structure shown in Fig. 2.

Referring to Fig. 1 of the drawings, there is shown an assembly composed of the following elements: A conduit 1 connected to the water cooling system of the motor and transmitting variations of pressure in the latter proportional to changes of speed; cooling fluid 2 delivered by conduit 1 and reacting on a diaphragm 3, a conduit 4 connected to the intake manifold of the motor and transmitting variations in depression, produced by the latter, to a chamber 5 contiguous to diaphragm 3 and limited on opposite sides by the latter and by a second smaller diaphragm $3^1$; a rod $3^2$ connected to diaphragm 3 and $3^1$ and reacting on a pivoted lever 14; a spring 6 opposing the movement of rod $3^2$ under the effects of increasing speed but aiding displacements due to increased depression; a roller 7 interposed between lever 14 and a pivoted system under the action of spring 6, said roller being operative by the vehicle operator to modify the automatic control, a manually operable link-and-lever system being connected to said roller for this purpose; a snatch-gear assembly designed to obtain three advancing and one reverse speed and comprising a rotatable shaft 8 having a plurality of guiding ribs or slots formed in the longitudinal direction thereof, a main clutch element 9 slidably mounted on said shaft a pair of speed changing gears 10 and 11, slidably guided on the same shaft, three advancing and one reversing gear, I, II, III, and MA respectively, a pair of cams 12 and 13 provided with appropriate slots and operating to effect displacement of elements 10 and 11 to change speed, a shaft 15 supporting cams 12 and 13 and adapted to rotate in opposite directions, a motor shaft 16 connected to a motor (not shown) and fitted with a pinion adapted to indirectly drive shaft 15, reversing assembly 17, $17^1$, $17^2$, driven by shaft 16 and including electro-magnetically operated clutches $17^1$ and $17^2$ adapted to effect rotation of shaft 15 in one direction or the other (as will appear from inspection of the drawings), a cam 20 keyed to shaft 15 and operative to actuate main clutch 9, and a compensating device $20^1$, spring actuated, and operative to throw out clutch 9 each time that a change of speed ratio is effected; a pair of contacts $19^1$ and $19^2$ positioned in the path of movement of the conducting extremity of lever 14 and adapted to control the gear shifting operations on the increasing or decreasing sides; a battery 18 connected to the insulated end of lever 14, and adapted to supply current via terminals $19^1$ and $19^2$ to clutches $17^1$ and $17^2$ so as to rotate a dial assembly designed to control the various snatch gears so as to obtain (1) three advancing speeds, (2) one reverse speed, or (3) operation in neutral, and consisting of a pair of cams 23 and 24 and an indicating hand 22 all keyed to shaft 15 (the latter are shown as they would appear if shaft 15 were viewed end-wise), cams 23 and 24 being provided with bosses $23^1$ and $24^1$ respectively formed so as to close and open circuits to be described further on controlling reverse (position $r$) forward movement (position $s$) and neutral (position $t$), the length of boss $23^1$ being substantially equal to the distance $t\,r$, and that of boss $24^1$, that of distance $t\,s$,—two pairs of switches $25^1$, $25^2$, $26^1$, $26^2$ adapted to be closed or opened by bosses $23^1$ and $24^1$ in a manner to be described further on,—an insulated dial 21 with contacts $25^a$, $25^b$, $26^a$ and $26^b$ positioned in similar relation to one another as switches $25^1$, $25^2$ and $26^1$, $26^2$, contact points $25^a$ and $25^b$ being positioned concentrically and in spaced relation to contact points $26^a$ and $26^b$,—conductors extending between points $25^1$ and $25^a$, $25^2$ and $25^b$, $26^1$ and $26^a$, and $26^2$ and $26^b$,—an index 27 and a pair of circular sectors mounted on dial 21, the latter being connected to source of current 18 and positioned so that sector $23^a$ may be moved to bridge the gap between contact points $25^a$ and $25^b$ while sector $24^a$ may be moved to bridge contact points $26^a$ and $26^b$, said sectors being spaced angularly so that when dial 21 is in neutral position $t^1$, they are clear of contact points $25^b$ and $26^a$ lying along the same radius,—and conductors extending from switches $25^1$ and $25^2$ to clutch $17^1$ and from switches $26^1$ and $26^2$ to clutch $17^2$.

The herein above described assembly functions in the following manner: The automatic gear shifting assembly operates under the combined action of (1) the circulating pump (rotary or like type) effecting changes of pressure of fluid 2 proportional to changes in motor speed; (2) changes in the depression in the intake manifold which are a function of both the speed and the load on the motor; and (3) spring 6 favoring displacements due to the load speed complex and opposing those due to the speed alone, these combined variables react on control lever 14 (1) so as to bring the conducting end of the latter into contact with terminals $19^1$ or $19^2$ so as to actuate either one of clutches $17^1$ or $17^2$, or (2) else act to move said conducting end into position between said terminals to obtain operation in neutral; assuming the assembly to be in the position shown in Figure 1, that is to say, with index 27 of dial 21 in the position $t^1$, shaft 15 in position $t$ and switches $25^1$ and $26^2$ in open position, it will be seen that current cannot pass by switches $25^2$ and $26^1$ in spite of the fact that they be closed since contact points $25^b$ and $26^a$ are out of contact with sectors $23^a$ and $24^a$ and that, therefore, clutches $17^1$ and $17^2$ cannot be operated; if, now, index 27 of dial 21 be moved into position $r^1$ corresponding to reverse, sector $23^a$ will no longer contact with point $25^a$ corresponding to switch $25^1$ while sector $24^a$ will move into contact with terminal $26^a$ so as to close the circuit leading to switch $26^1$, the latter being closed since shaft 15 has not yet rotated; clutch $17^2$ will therefore be actuated and shaft 15 will turn until index 22 comes into line with position $r$ (one-fifth of a turn); when this happens, boss $24^1$ will move away from switch $26^1$, the circuit leading to clutch $17^2$ will be broken, and shaft 15 will come to rest after having rotated cam 12 through an angle sufficient to actuate the gears controlling reverse; during this time cam 20, rotating with shaft 15, actuates main clutch 9 so as to assure driving action in the reverse direction; if after having moved backward any desired distance, the operator wishes to stop the vehicle, he moves dial 21 so that index 27 indicates position $t^1$; the circuit between sector $24^a$ and terminal $26^a$ is then broken while switch $25^1$ closes under the action of boss $23^1$, index 22 of shaft 15 having remained in position $r$, current from source 18 will then pass via sector $23^a$, terminal $25^a$, and switch $25^1$ to clutch $17^1$ so as to rotate shaft 15 in the opposite direction and return the latter to neutral position; in rotating, shaft 15, after having thrown out principal clutch 9, throws the reversing element MA out of gear, opens switch $25^1$ when rotation has been sufficient to return index 22 to position $t$, and closes switch $25^2$; if the operator wishes to advance in the normal way, dial 21 is rotated so that index 27 indicates points $s^1$; sector $23^a$ coming in contact with terminal $25^b$ then energizes clutch $17^1$ and rotates shaft 15, switch $25^2$ remains closed until boss $23^1$ moving toward position $s$, moves away thereby opening the circuit to clutch $17^1$ and stopping shaft 15 (one-fifth of a turn); the rotation of shaft 15 (principal clutch 9 is thrown out by cam 20 when shaft 15 is in neutral position) causes cam 12 to move the gears into first speed I, then actuates clutch 9 through the intermediary of cam 20; it is only after the gears are in driving relation for first speed that lever 14 is able to become active since prior thereto, it had not been in conductive relation with battery 18; it is necessary for sector $24^a$ to come into contact with a special terminal $x$ corresponding to position $s^1$ of dial 21 for this conductive relation be established (during the movement of shaft 15 from position $t$ to position $s$, lever 14, although connected to battery 18, does not leave neutral position since the forces acting thereon are not sufficient to effect its displacement); lever 14 will then act automatically to energize clutches $17^1$ or $17^2$ by contacting with terminals $19^1$ or $19^2$ according as the speed of, or the load on, the motor moves toward the increasing or decreasing sides; if at any time, the operator wishes to stop the vehicle or disengage the drive, he moves index 27 opposite point $t^1$ thus closing the circuit through clutch $17^2$ via sector $24^a$, terminal $26^b$ and switch $26^2$ so as to return shaft 15 to neutral position; if, inadvertently or voluntarily, the vehicle operator moves dial 21 to position $t^1$ when the gears are in second speed II, he breaks the circuit at $x$ between battery 18 and lever 14 and, since all the contacts, such as $25^1$, are open, it is necessary to provide safety means for returning shaft 15 to neutral position; this may be done by closing a switch 28 controlling an auxiliary circuit connecting clutch $17^2$ (speed reducing) to battery 18.

It is to be understood that by providing a plurality of switches of the type of switch 28, the vehicle operator may, at will, bring any combination of gears above first speed into play. It suffices, in such a case, to connect the switches in question to cams 23 and 24 and to a plurality of terminals similar to $x$ mounted on dial 21. The operator may thus direct the current from terminals $x$ to lever 14 and so obtain automatic or manually controlled operation at will.

It is to be understood, of course, that assembly 1, 2, 3, 4, 5, 6, may be replaced by any other type of mechanism responding either to changes of speed of or changes of load on, the motor.

In the form of device shown in Fig. 2, changes of speed are automatically effected by centrifugal masses 30 pivotally mounted on motor shaft 31 and also by combined changes of motor speed and load effected by movement of a diaphragm 33 positioned in a chamber 32 connected by a conduit 31 to the intake manifold of the motor, said diaphragm acting on a lever 34 against the action of a spring to displace a link-and-lever system to be described further on. A roller 36, similar to roller 7 in Fig. 1 permits modification of the automatic control by the vehicle operator.

The speed changing assembly is, here, of the electro-magnetic type and includes three forward speeds I, II, III, and one reverse speed MA. Electro-magnetic clutches $41^1$, $41^2$ and $41^3$ receive current from rings $42^1$, $42^2$ and $42^3$, respectively, connected to a series of terminals $43^1$, $43^2$ and $43^3$ and operate to change the ratio of multiplication between motor shaft 39 and driven shaft 40. A similar assembly $41^4$, $42^4$ and $43^4$ actuates the reverse drive, while a dead terminal $43^5$ comes into action during neutral operation.

The circuit actuating clutches $41^1$, $41^2$ and $41^3$ are energized automatically by a lever similar to element 14 in Fig. 1, but, in order that the vehicle operator may control the movements of said lever so as to displace the latter at will toward neutral, reverse or advancing positions, means must be provided for adjusting the position thereof manually.

The single lever 14 shown in Fig. 1 is, therefore, replaced by a combination of three levers $14^a$, $14^b$, and $14^c$. Lever $14^a$ follows the displacements of centrifugal masses 30 and of lever 34 and controls automatic gear-shifting when the vehicle is advancing. If prolonged, it could contact with any one of terminals $43^1$, $43^2$ or $43^3$. Lever $14^b$ may be displaced manually by the vehicle operator by means of a dial 21 capable of occupying any one of three positions $s^1$, $t^1$ and $r^1$ corresponding respectively, to advance, neutral and reverse operation. This latter lever follows the displacement of dial 21 under the combined opposing action of a cable 44 and a spring 45. This lever, if extended would occupy a position lying outside of contact terminals $43^3$, $43^4$ and $43^5$. Its course is, therefore, sufficient to embrace all of the terminals. Lever $14^c$ is connected to the source of electrical energy and may contact with any one of the terminals to throw in or throw out any or all of the clutches and is connected to lever $14^a$ by a spring 46 sufficiently strong to insure its movement with the latter in the direction of arrow X (increasing speeds). It is to be noted that lever $14^c$ serves merely to make and break the various circuits and encounters no appreciable resistance in the course of its movement. A pin 47 mounted on lever $14^c$ acts to displace the latter in the direction of decreasing speeds from terminal $43^3$ toward $43^1$ under the action of lever $14^a$. Lever $14^c$ is displaced by lever $14^b$ through the intermediary of a pin 47 mounted on the former and in the direction of arrow Y from terminal $43^1$ toward terminals $43^4$ and $43^5$. The return of lever $14^c$, as soon as the action of pin 48 ceases, is effected by a spring 46 connected to lever $14^a$, the latter being maintained in the position corresponding to first speed.

When the vehicle is operating in third speed, that is to say, in direct drive, and the operator wishes to move dial 21 into neutral position, lever $14^c$ is displaced by pin 48 so as to throw out of action the various other speed combinations without intervention of the automatic speed regulating elements, this being rendered possible by spring 46.

The same result could be obtained by employing a single lever 14 similar to the one shown in Figure 1 connected to the source of current and capable of being displaced into contact with any one terminals $43^1$, $43^2$ or $43^3$. In such a case, to permit the vehicle operator to obtain either neutral operation or reverse, terminal assembly $43^1$ to $43^5$ should be mounted on a movable support (Figure 4) capable of being displaced about the point of articulation of lever 14 as a center. By displacing said support manually or otherwise against action of spring $45^1$, any desired terminal may be brought into contact with lever 14 irrespective of the speed in which the vehicle is operating.

Fig. 3 shows a variant of a triple-lever control of the type represented in Fig. 2, the speed-changing operations being effected by means of a cam shaft similar to shaft 15 in Fig. 1. Lever 14ᶜ is not, as in Fig. 1, normally in neutral position, but can occupy a number of characteristic positions corresponding to the five operating conditions shown in Fig. 2. In the triple-lever assembly, lever 14ᵃ moves under the action of the automatic speed-changing devices (elements 30 and 34 in Fig. 2 or rod 3² in Fig. 1) and on lever 14ᶜ through the intermediary of spring 46 and pin 47. Lever 14ᵇ may be displaced by the vehicle operator by means of a dial 21 (Figure 2) so as to displace lever 14ᶜ through the intermediary of pin 48.

Lever 14ᶜ carries a conducting terminal 51 connected to the source of electrical energy and is capable of contacting with one of two circular sectors 52 and 53 composed of conducting material and supported in insulated relation to a sector 54 keyed to shaft 15, said last-named sector functioning as current distributor. In order to facilitate the explanation of the manner in which this assembly operates, a series of indices $r, t, s$, II, III, IV etc., have been marked along the course of movement of lever 14ᶜ to show when the latter is in the position corresponding to reverse, neutral, and the various advancing speeds, shaft 15, obviously, occupying a predetermined position corresponding to each of these operating conditions. Shaft 15 may be driven by a combination similar to 16, 17, 17¹ and 17², shown in Fig. 1, clutch 17¹ being connected to sector 52 to control increasing speed-changes and clutch 17², to sector 53 to effect decreasing speed combinations.

This assembly functions in the following manner:

Assuming that the various operating elements are in a position shown in Fig. 3, that is to say, in neutral, lever 14ᶜ occupying a position between, and out of contact with, sectors 52 and 53, while shaft 15 is at rest; when the operator displaces his dial so as to move lever 14ᵇ so that pin 48 reacts on lever 14ᶜ to bring the latter in line with index $r$ and in contact with sector 53, current flows toward clutch 17² and shaft 15 begins to turn in the direction of arrow Z until the non-conducting interval between sectors 52 and 53 moves into line with lever 14ᶜ; the circuit is then broken and shaft 15 stops in the position for which cam 12 (Fig. 1) has effected the proper gear combination for reverse (MA); if the operator moves the dial into neutral position, lever 14ᶜ moves into contact with sector 52 thus closing the circuit through clutch 17¹ and shaft 15 rotates in the direction opposite to arrow Z until the various operating elements are back into a position represented in Fig. 3; when the operator displaces dial 21 to indicate $s¹$ (Fig. 2), lever 14ᶜ moves into position before index $s$ and shaft 15 follows the movement until the current is interrupted; the automatic speed-controlling elements may then enter into action to displace lever 14ᶜ into positions $s$, II, III, etc., in accordance with changes of load or speed or both.

In order to permit the operator to move into neutral position irrespective of the conditions of operative, sector 53 is made sufficiently long to remain in contact with lever 14ᶜ whatever be the position of sector 54. Shaft 15 will therefore rotate without stopping through the entire range of descending speed positions independently of the automatic speed-control assembly.

If it be desired that shaft 15 be capable of effecting a complete rotation while lever 14ᶜ moves through an angle less than 360°, sector 54 and levers 14ᵃ, 14ᵇ and 14ᶜ may be mounted on an auxiliary shaft and movement may be transmitted thereto in demultiplying relation by means of a toothed sector meshing with a pinion keyed to shaft 15.

It is perfectly obvious that the invention is not limited to the particular features shown in any single figure; thus, automatic speed-control combination 1, 2, 3, 4, 5, 6, in Fig. 1 may be replaced by combination 30, 31, 32, 33, 34, 35 in Fig. 2, or by any one of the devices equivalent thereto disclosed in applicant's co-pending application, Ser. No. 440,020, filed March 28, 1930, the single or triple-control lever combinations shown in Figs. 2, 3 and 4 may be used interchangeably; the electro-magnetic speed changing assembly shown in Fig. 2 may be used interchangeably with the one shown in Fig. 1 in combination with the various automatic speed-controlled devices above mentioned, or with any one of the lever controls referred to.

From the foregoing, it will be seen that the vehicle operator needs only adjust dial 21 to indicate advances or reverse and then depress the accelerating pedal to obtain automatic operation, all clutches and gear shifting levers being done away with.

What I claim is:—

1. In combination, a motor including a driving shaft, a driven shaft, means for coupling said driving and driven shafts in various speed ratios, means including a lever operative by changes in the load on the motor and by variations in speed of one of said shafts to actuate said last named means, a movable control adapted to occupy any one of three positions corresponding to operation of the motor in reverse, neutral, and advance, and means operative by the displacement of said movable control to react on both of the aforementioned means so that the vehicle may operate in reverse, neutral, and in any one of a plurality of advancing speeds.

2. In a vehicle assembly a motor including a driving shaft, a driven shaft, means for coupling said driving and driven shafts in various speed ratios, means including a lever operative by both changes in load on the motor and by variations in speed in one of said shafts to actuate said last named means, a movable control mounted to occupy any one of three positions corresponding to operation of the vehicle in reverse, neutral and advance, and electrical means operable by displacement of said movable control to actuate said lever so that the driving and driven shafts are coupled in relations corresponding to neutral, reverse, and any one of a plurality of advancing speeds.

3. In a vehicle assembly, a motor including a driving shaft, a driven shaft, means for coupling said driving and driven shaft in various advancing ratios and in reverse, means including a lever operative by both changes in load on the motor and variations in speed of one of said shafts to actuate the said last named means, a dial operative to occupy any one of a plurality of positions corresponding to operation in advance, neutral, and reverse, and electrical means operative by movement of said dial into one of said plurality of positions to actuate said lever so that the vehicle may operate in neutral, reverse, or any one of a plurality of advancing speeds.

4. In the vehicle assembly, a motor including a driving shaft, a driven shaft, means for coupling said driving and driven shafts in neutral, reverse, and any one of a plurality of advancing speeds, means including a first lever operative by variations in motor load and by changes in the speed of one of said shafts to actuate said last named means, a second lever coupled elastically to said first named lever, a movable control element connected to said second lever and operative to react on said first lever through the intermediary of the latter, and means operative by displacement of said movable control and by said first lever to actuate said first named means so that the motor operates in neutral, reverse, and in any one of a plurality of advancing speeds.

5. In a vehicle assembly, a motor including a driving shaft, a driven shaft, means for coupling said driving and driven shafts in various speed ratios, electrical means including a plurality of terminals operative to control said last named means, means including a first lever positioned to move into contact with any one of said terminals, said first lever being responsive to variations in load on the motor and changes in speed of one of said shafts, a second lever flexibly connected to said first lever, a rotatable dial adapted to occupy any one of a plurality of positions corresponding to operations in neutral, reverse, and advance and connected to said second lever, whereby rotation of said dial will successively displace said second and third levers to actuate said first named means so that the vehicle operates in neutral, reverse, and in any one of a plurality of advancing speeds.

6. A structure as defined in claim 5 in combination with means for displacing said first lever and said terminal relatively to one another.

7. In a vehicle assembly, an automatic gear shift including a driving shaft, a driven shaft, means for coupling said driving and driven shafts at various speed ratios and in relations corresponding to neutral, and advance, a cam shaft controlling said last named means, means operative by changes in load on, and by variations in speed of, the motor to control rotation of said cam shaft, hand operated means controlling rotation of said cam shaft and operative to actuate said cam shaft so that the driving and driven shafts are coupled in neutral, reverse, and advancing relation as desired.

8. In a vehicle assembly, a motor including a driving shaft, a driven shaft, means for coupling said driving and driven shafts in various advance speed ratios and in reverse, a cam shaft controlling said means, means operative by variations in load on the motor and by changes in speed to rotate said cam shaft in steps of one fifth of a revolution, each of said steps corresponding to a different relative speed of the driving and driven shafts, and hand controlled means operative to rotate said cam shaft in steps of one fifth of a revolution, whereby said cam shaft may occupy a position corresponding to any one of several advance speeds, neutral, and reverse, as desired.

9. In combination, a motor including a driving shaft, a driven shaft, means for coupling said driving and driven shaft in various speed ratios, means including a lever operative by changes in suction exerted by the motor to actuate said last named means, a movable control mounted to occupy any one of three positions corresponding to operation of the vehicle in reverse, neutral and advance, and means operative by displacement of said movable control to react on both of the aforementioned means so that the vehicle may operate in reverse, neutral, and in any one of a plurality of advancing speeds.

In testimony whereof I affix my signature.

GASTON FLEISCHEL.